United States Patent [19]

Schmidlin et al.

[11] Patent Number: 4,992,132

[45] Date of Patent: Feb. 12, 1991

[54] APPARATUS FOR THE PRODUCTION OF AN ENDLESS HONEYCOMB BAND

[75] Inventors: Hans Schmidlin, Aesch; Christoph Rohrer, Binningen, both of Switzerland

[73] Assignee: Hans Schmidlin, Aesch, Switzerland

[21] Appl. No.: 367,631

[22] Filed: Jun. 19, 1989

[30] Foreign Application Priority Data

Jun. 18, 1988 [DE] Fed. Rep. of Germany ....... 3820718

[51] Int. Cl.[5] ............ B32B 31/18

[52] U.S. Cl. ............ 156/498; 156/197; 156/264; 156/291; 156/512; 156/548

[58] Field of Search ............ 156/197, 264, 291, 512, 156/548

[56] References Cited

U.S. PATENT DOCUMENTS

| | | | |
|---|---|---|---|
| 2,983,640 | 5/1961 | Knoll et al. | 154/122 |
| 3,184,365 | 5/1965 | Rule | 156/548 |
| 3,220,906 | 11/1965 | Lincoln | 156/197 |
| 3,257,253 | 6/1966 | Hoyt | 156/256 |
| 3,713,954 | 1/1973 | Clark et al. | 156/197 |
| 3,979,252 | 9/1976 | Hoyt | 156/512 |
| 4,133,712 | 1/1979 | Geschwender | 156/264 |
| 4,732,630 | 3/1988 | Schnebly | 156/197 |

FOREIGN PATENT DOCUMENTS

| | | |
|---|---|---|
| 1078296 | 5/1980 | Canada . |
| 0243008 | 10/1987 | European Pat. Off. . |

*Primary Examiner*—Caleb Weston

*Attorney, Agent, or Firm*—Foley & Lardner, Schwartz, Jeffery, Schwaab, Mack, Blumenthal & Evans

[57] ABSTRACT

The invention relates to a process and an apparatus for the production of an endless honeycomb band, consisting of flatly adjacent, partially bonded strips, which band can be drawn out by stretching in band longitudinal direction to form a honeycomb. Film sheets are continuously drawn off from a plurality of coils, provided on one side with equally spaced glue strips running mutually parallel in the sheet longitudinal direction and subsequently being laid one on top of another. The gluing is performed with a hotmelt adhesive, which is sprayed onto each film sheet in the form of a plurality of strips. The glue strips of the one film sheet are arranged offset with respect to the above-lying or below-lying film sheet by half a strip spacing in each case. The multiply film band is then treated for the intersetting of its individual plies by pressure and/or temperature and is finally divided transversely into sections of the desired width, which are stacked one on top of the other and pressed to form the endless honeycomb band. Film sheet sections of the same length are cut off, after the setting of its plies, from the end of the film band lying at the front in conveying direction, and are placed in layers one on top of another into intermediate stacks, which are pressed individually into packs. The packs are successively divided up into band sections, which are pressed to form the honeycomb band under the application of heat and subsequently cooled.

10 Claims, 4 Drawing Sheets

APPARATUS FOR THE PRODUCTION OF AN ENDLESS HONEYCOMB BAND

BACKGROUND OF THE INVENTION

The invention relates to a process for the production of an endless honeycomb band, consisting of flatly adjacent, partially bonded-together strips, which band can be drawn out by stretching in the band longitudinal direction to form a honeycomb. More particularly, the invention relates to a process wherein a plurality of film sheets are continuously drawn off from a plurality of coils, provided on one side with a plurality of glue strips which run mutually parallel in the sheet longitudinal direction and are equally spaced apart, and subsequently laid one on top of the other such that the glue strips of each film sheet are arranged offset with respect to those of the above-lying or below-lying film sheet by half a strip spacing in each case. The multi-ply film band is then treated with heat and/or pressure for the intersetting of its individual plies, and is finally divided transversely into sections of the desired width. The sections are subsequently stacked one on top of the other and pressed to form the endless honeycomb band.

The invention also relates to an apparatus for carrying out the above-mentioned process.

The general process is known, for example, from Canadian Patent Specification No. 1,078,296. The processing in this case is performed from four coils, the strips being cut off in each case from the front end of the multi-ply film band. A comparable process is also disclosed by U.S. Pat. No. 3,257,253.

SUMMARY OF THE INVENTION

Accordingly, it is an object of the present invention to provide an inexpensive process for the production of an endless honeycomb band.

Another object of the present invention is to provide a process which can be carried out using compact, high-capacity installations.

A further object of the present invention is to provide an apparatus for carrying out the above-described process.

In accomplishing the foregoing objectives, there has been provided, in accordance with one aspect of the present invention, a process for the production of an endless honeycomb band which comprises the steps of: continuously drawing off a plurality of film sheets from a plurality of coils; providing each of the sheets with a plurality of mutually parallel glue strips which extend in the longitudinal direction of the sheet and are equally spaced apart, wherein the plurality of glue strips are provided by applying a plurality of strips of hotmelt adhesive onto each sheet; disposing the plurality of sheets one on top of another such that the plurality of glue strips of each sheet are offset with respect to the plurality of glue strips of the sheet lying above or below the sheet by one half of the spacing between the glue strips; treating the plurality of film sheets with heat or pressure such that the sheets are intersect to form a multi-ply film band; cutting a plurality of film sheet sections of equal length from the forward end of the film band, relative to the direction of conveyance; arranging the sections one on top of another to form an intermediate stack; pressing the stack to form a pack; successively dividing the pack into a plurality of band sections, such that a multiple of the width of the band sections is equal to the length of the film sheet sections; and pressing the band sections with the application of heat to form the honeycomb band.

In accordance with another aspect of the present invention there is provided an apparatus for performing the recited process, which comprises: means for the continuous feeding of a plurality of film sheets; a plurality of hotmelt adhesive applicators each of which has at least one slot die with an interchangeable slot mask for the creation of the glue strips; laminating means for intersetting the individual plies of the film band; first transverse cutting means for the cutting-off of the film sheet sections; means for storing the stacks formed from the film sheet sections; second transverse cutting means for the cutting-off of the band sections; a pressing channel, which is arranged underneath the second transverse cutting means, forming an accumulation device, and having at its inlet a partial ram, which presses each band section sequentially into the pressing channel and controllable retainers which guide the band sections already located in the pressing channel; heating means, acting on the pressing channel, for the interbonding of the band sections; and downstream cooling means for the endless honeycomb band.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings by which

DETAILED DESCRIPTION OF THE PREFERRED EMBODIMENTS

Figure 1:
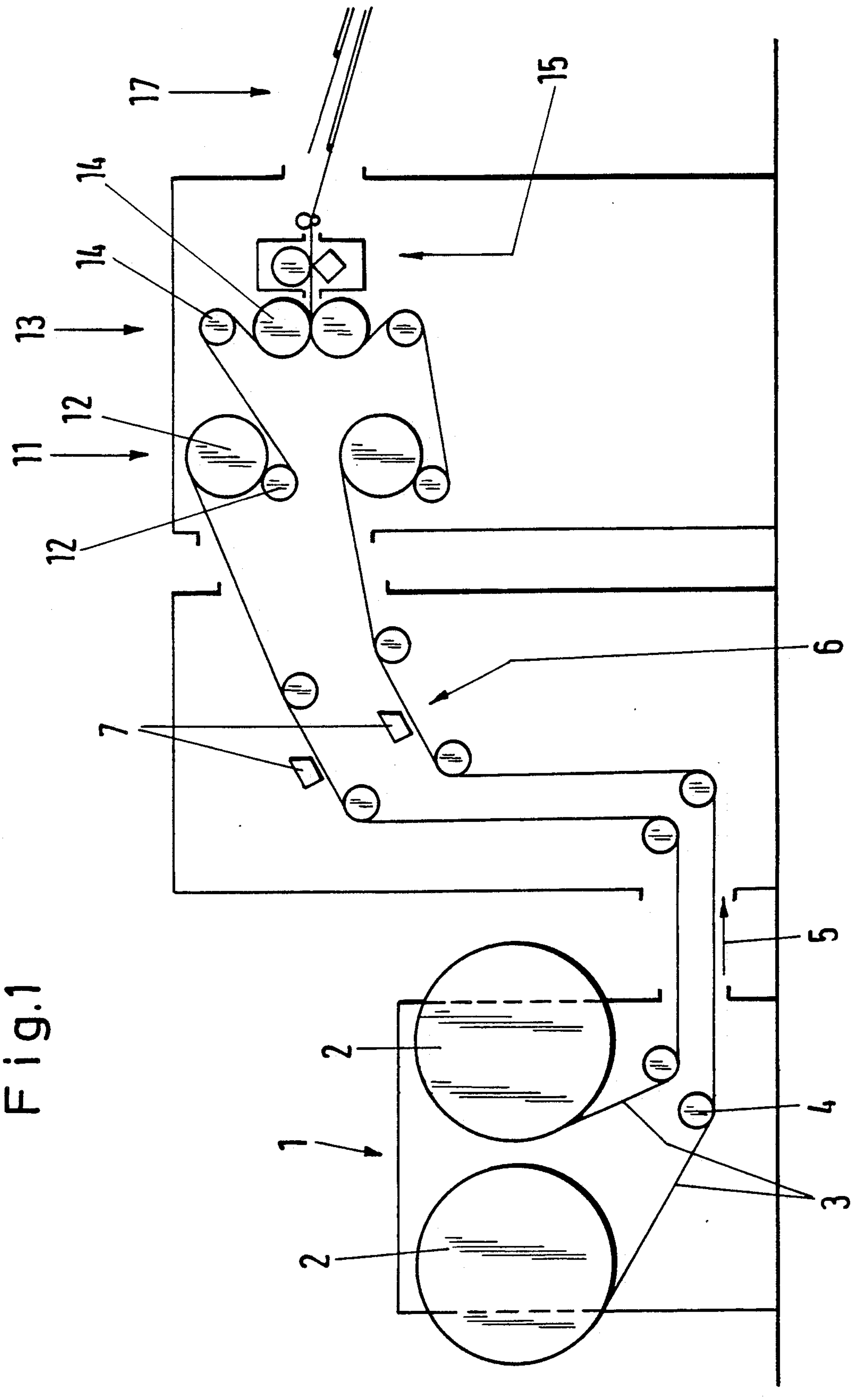
FIG. 1 shows the left part of an installation.

According to the invention, the glue strips are preferably formed from hotmelt adhesive, which from the outset is applied in strips but not in bead-like tracks. All of the cooling devices have the purpose of cooling the materials heated up for bonding back to a maximum temperature allowable with respect to handling before further processing. In this case, the cooling devices can be integrated in the conveying means. Soiling of the deflection rollers or pressure rollers by the hotmelt adhesive is thus avoided.

To achieve a compact installation with low susceptibility to faults, the processing of only two coils is preferred. To achieve a high capacity, the change-magazining station is used, which makes possible the formation of intermediate stacks and thus a high performance of the second transverse cutter, although the processing is only performed from two coils.

The accumulation device formed by the pressing channel operates continuously or else in the rhythm of the second transverse cutter; the strips, accumulated under pressure, are thus conveyed continuously or intermittently through the pressing channel.

Further features and advantages of the invention are explained in more detail with reference to the exemplary embodiment shown in the drawings.

Figure 2:
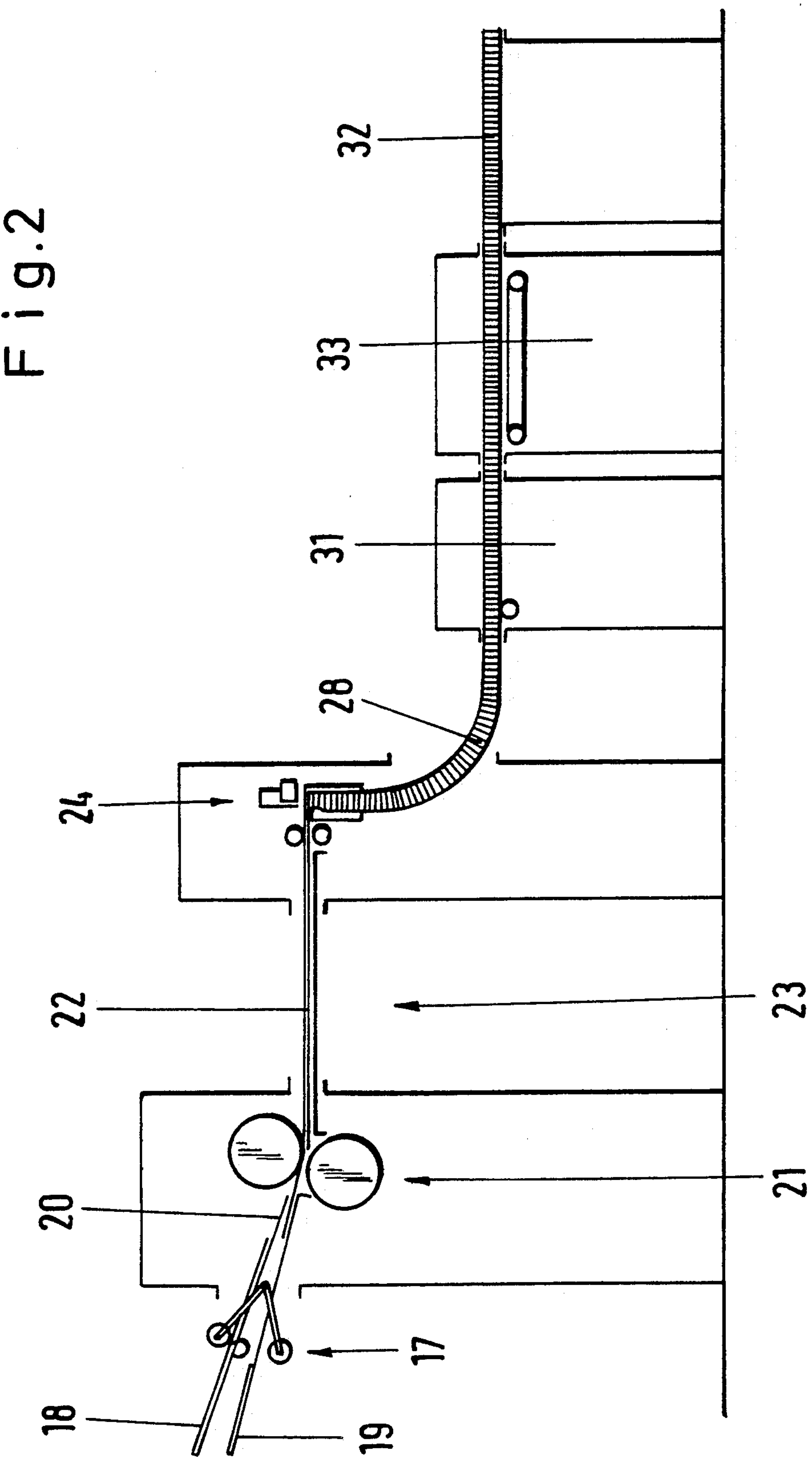
FIG. 2 shows the right part of the installation according to FIG. 1.
Figure 3:
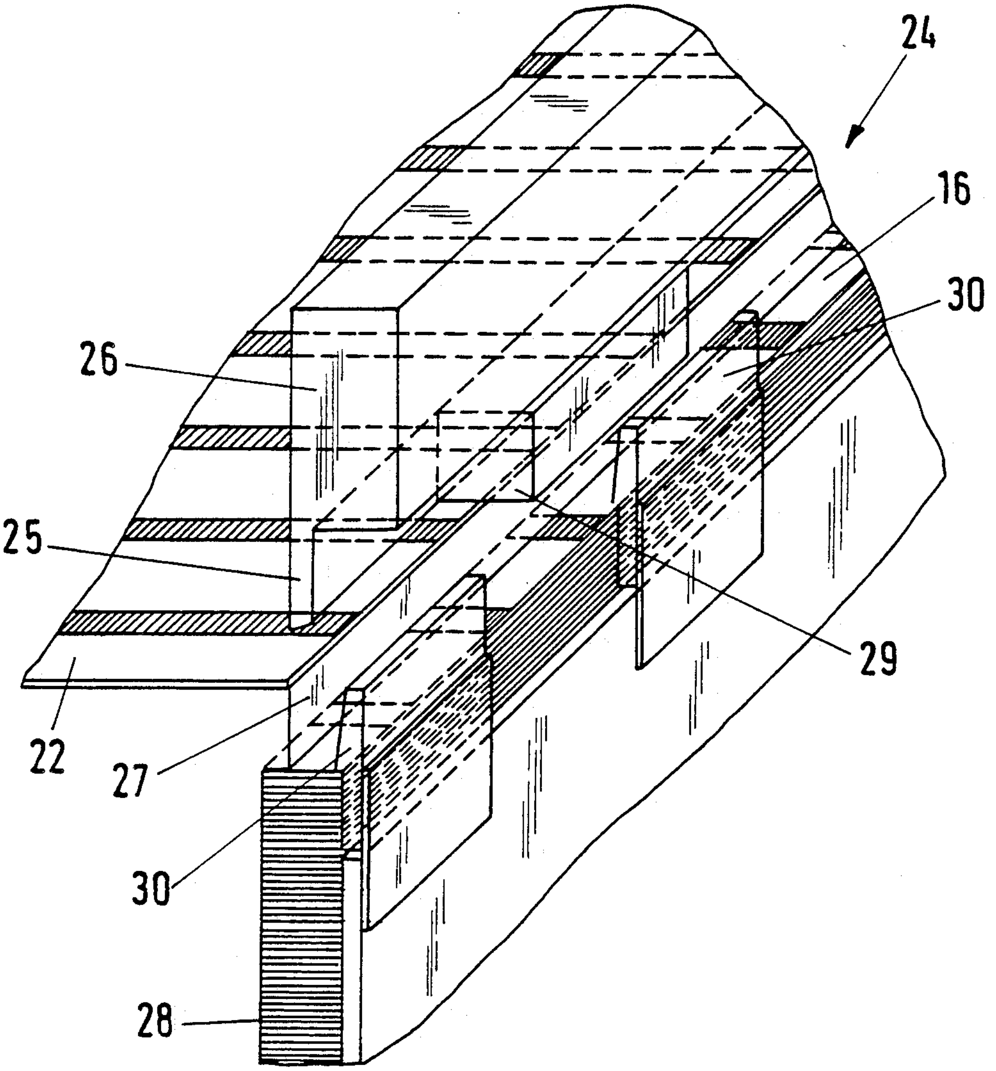
FIG. 3 shows a transverse cutter on an enlarged scale and perspective representation in cut-out.

The installation according to FIGS. 1 and 2 serves for the production of an endless honeycomb band and comprises the following stations, seen from left to right.

Figure 4:
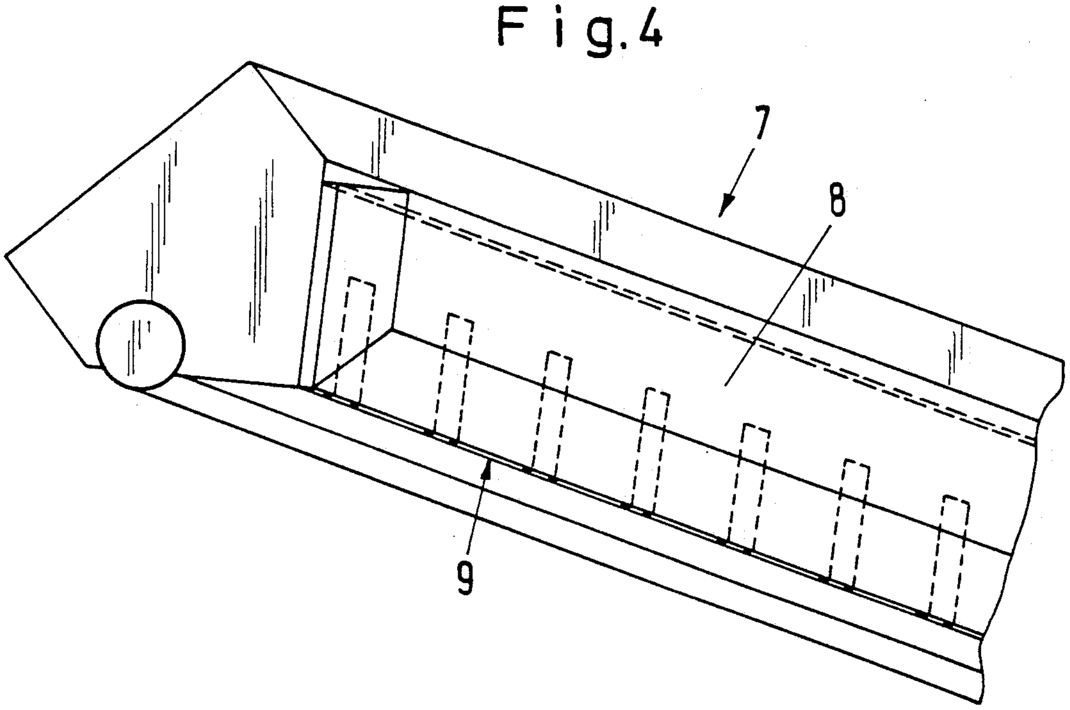
FIG. 4 shows a hotmelt adhesive applicator.
Figure 5:
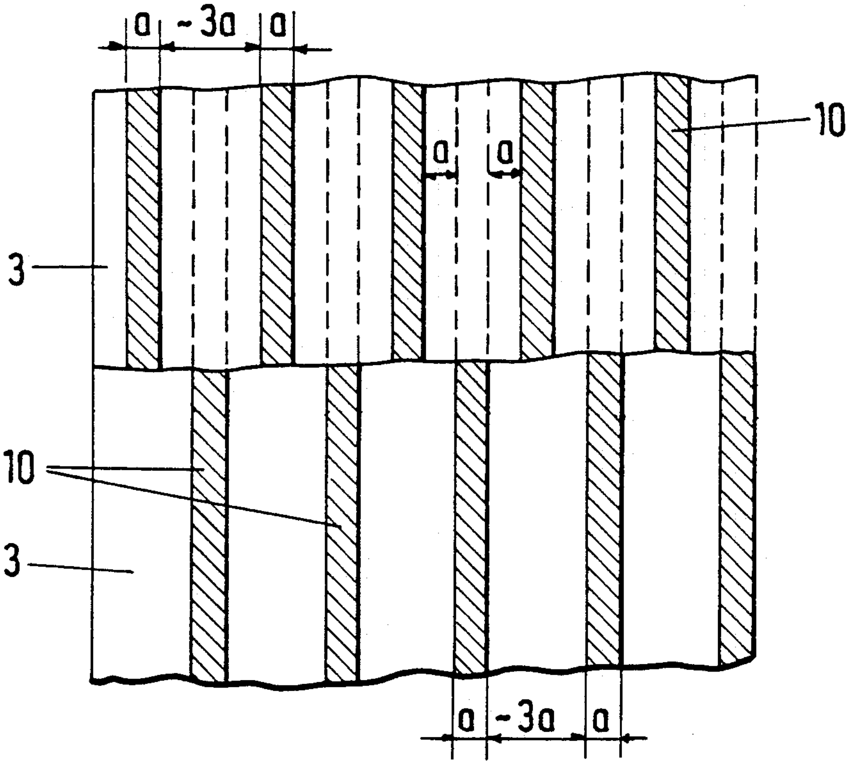
FIG. 5 shows the glue strip former of two film sheets, in plan view.

An unwinding station 1 comprises two coils 2, from each of which a film sheet 3 is drawn off continuously. Metal foils may be employed as the film sheets. Deflection means 4, which may consist for example of rollers or the like, are among the provisions for the guidance of the two film sheets 3. Seen in the conveying direction 5 of the film sheets 3, the unwinding station 1 is followed by a coating station 6. This comprises a hotmelt applicator 7 for each film sheet 3, which applicator has at least one slot die 8 with interchangeable slot mask 9 (see FIG. 4) for the creation of glue strips 10 on the upper-lying film sheet side in each case (see FIG. 5). These glue strips 10 run in the longitudinal direction of the film sheet 3; the glue strips 10 are mutually parallel and are spaced equally apart in each case, the glue strips 10 of the lower film sheet 3 being arranged offset in each case by half a strip spacing with respect to the glue strips 10 of the upper film sheet. If the width of each glue strip 10 is denoted by a, the clear distance between two glue strips 10, i.e. the strip spacing, is preferably three a. In this case, the strip geometry determines the size of the honeycomb core diameter.

Hotmelt adhesive is a solvent-free, environmentally harmless adhesive which can be reactivated by heat and is applied in strips, but not in bead-like tracks. Over the width of the film sheet there may be provided, for example, two slot dies, the slot opening of which can be covered by metal plates, sheets or the like, into which the openings are punched at the intervals desired for the glue strips 10. Consequently, to alter the honeycomb structure to be produced, all that is necessary is to change these stencils. This entails a lesser amount of time and low material costs in comparison with roller application systems.

To create the offset mentioned above of the glue strips 10 between the two film sheets 3, it is sufficient to offset the one slot die 8 by half the glue strip spacing in the axial direction with respect to the other slot die, or else to design the slot masks correspondingly.

Downstream of the coating station 6 is a cooling station 11 for the glued film sheets 3. In the exemplary embodiment represented, this cooling station 11 is formed by cooling rollers 12, via which the film sheets 3 are led, and which effect the transport of the film sheets and their stressing, which is necessary for a clean application of adhesive.

Downstream of the cooling station 11 is a laminating station 13, which is formed by a pair of rollers 14, through which the two film sheets 3, now lying one on top of the other, are guided simultaneously, the deflection rollers on the feed side serving as edge control of the film sheets. This laminating station serves to bring together the two film sheets 3 and to intersect them, it being intended that the bonding of the two film sheets should only go as far as to prevent a relative displacement between the film sheets.

Downstream of the laminating station 13 there is arranged a first transverse cutter 15, which may be designed as a rotational transverse cutter, so that a continuous draw-off of the film sheets 3 from the coils 2 can be maintained. This first transverse cutter 15 cuts off film band sections of the same length from the respective front end of the now double-ply film sheet, which sections correspond with regard to their length to a multiple of the width of the strips 16 later to be produced, the length being selectable and able to be, for example, a maximum of 1300 mm. These double-plied film band sections are stacked in a change-magazining station 17, which forms a buffer store and has a drawer chute provided with two deposit levels 18, 19. On reaching the selected number of band sections, for example ten double-plied film band sections, this intermediate stack 20 is automatically fed to a heating calender 21, while at the same time double-plied film sheet sections are continuously stacked into a stack 20 on the second drawer level. In the heating calender 21, the stacks 20 successively fed from the respective deposit level 18 or 19 of the change-magazining station 17 are heated to the necessary temperature and pressed or baked under the necessary pressure into a pack 22.

The pack 22 then passes onto a downstream delivery table, which serves as connecting and cooling section 23 from the heating calender 21 to a second transverse cutter 24. The latter has a cutting knife 25, which is controlled in a perpendicular plane and to which there are assigned a knife beam 26 arranged above the pack 22 and having partial rams or hold-down bars 29 and a counter-knife 27 lying below this pack 22. In this second transverse cutter 24, the fed packs 22 are trimmed if need be and then cut into strips 16, the width of which can be set freely, according to the ultimate honeycomb height. Any superfluous cut-off and residual pieces are automatically ejected and collected.

Below the second transverse cutter 24 there is arranged a pressing channel 28, which forms an accumulation device and has at its inlet a partial ram 29, pressing the respective strip 16 last cut off into the pressing channel and, for example electropneumatically or electromagnetically, actuable retainers 30, engaging in its free or intermediate spaces, for the strips 16 already located in the pressing channel 28. The pressing channel 28 is acted upon by heating means 31 for the interbonding of the strips 16. The endless honeycomb band 32 thus forms finally passes through cooling means 33.

The feed in the pressing channel 28 may be performed continuously or else intermittently. The preferably arcuately designed pressing channel 28 exerts such a high counterpressure on the advanced web that the strips 16 stacked one on top of the other are firmly interbonded under heat and pressure.

What is claimed is:

1. An apparatus for producing an endless honeycomb band comprising:

(a) means for the continuous feeding of a plurality of film sheets;

(b) a plurality of hot melt adhesive applicators each of which has at least one slot die with an interchangeable slot mask for the creation of a plurality of glue strips on each of said sheets which extend in the longitudinal direction of said sheets and are equally spaced apart;

(c) laminating means for intersetting said sheets to form a multi-ply film band;

(d) first transverse cutting means for cutting a plurality of film sheet sections of equal length from the forward end of said multi-ply film band, relative to the direction of conveyance;

(e) means for arranging said film sheet sections to form intermediate stacks;
(f) means for storing said stacks;
(g) means for pressing said stacks to form a pack;
(h) second transverse cutting means for cutting said pack to produce a plurality of band sections of equal width such that a multiple of the width of said band sections is equal to the length of said film sheet sections;
(i) a pressing channel, which is arranged underneath said second transverse cutting means, forming an accumulation device, and having at its inlet a partial ram which presses each band section sequentially into said pressing channel and controllable retainers which guide the band sections already located in said pressing channel;
(j) heating means acting on the pressing channel for the interbonding of said band sections to form said endless honeycomb band; and
(k) downstream cooling means for said endless honeycomb band.

2. The apparatus as claimed in claim 1, wherein each said hotmelt adhesive applicator has a plurality of supporting rollers on the side of said film sheet opposite said slot die.

3. The apparatus as claimed in claim 1, comprising cooling and drawing means for said glued film sheets.

4. The apparatus as claimed in claim 3, wherein said cooling and drawing means is formed by a plurality of cooling rollers, via which said film sheet is led.

5. The apparatus as claimed in claim 1, wherein said laminating means comprises a pair of rollers, through which said film band is led.

6. The apparatus as claimed in claim 1, wherein said first transverse cutting means is a rotational transverse cutter.

7. The apparatus as claimed in claim 1, wherein a heating calender for the pressing of said stacks into packs, is provided after said means for storing said stacks.

8. The apparatus as claimed in claim 7, wherein means for cooling said packs is provided between said heating calender and said second transverse cutting means.

9. The apparatus as claimed in claim 1, wherein said second transverse cutting means comprises (a) a cutting knife which is controlled in a perpendicular plane and to which there are assigned a knife beam arranged above said pack and a plurality of partial rams and (b) a counter-knife lying below said pack.

10. The apparatus as claimed in claim 1, wherein said means for storing said stacks comprises a drawer chute with two alternatingly actuable deposit levels, arranged one above the other.

* * * * *